Patented Dec. 19, 1933

1,940,317

UNITED STATES PATENT OFFICE 1,940,317

OIL FILTER ELEMENT

Charles W. McKinley, Flint, Mich., assignor to A C Spark Plug Company, Flint, Mich., a company of Michigan No Drawing. Application December 23, 1932
Serial No. 648,625

2 Claims. (Cl. 210—204)

This invention relates to oil filters and is particularly concerned with the composition of the filtering element or medium.

It is well known in the filtering art to use ordinary cotton waste as a filtering material for oil, the oil passing through a suitable layer, block or cylinder of the waste.

The passage of the oil through the filter has a tendency to compact the cotton waste and increase the resistance to the passage of oil at a rate faster than the accumulation of impurities by the filtering material, thus shortening the effective life of the filter. It is the object of the invention to render this cotton waste more pervious to the contaminating oil so that the filtering will take place over a greater length of time. For this purpose there is mixed with the cotton waste a quantity of hair, preferably long curled cattle tail hair. The hair itself will perform substantially no filtering function but it is much stiffer than the cotton waste and will hold the cotton waste extended more easily to allow the oil to pass into the interior of the filtering substance or media. The hair in no way interferes with the effectiveness of the cotton waste as a filtering element but prevents a rapid building up of pressure which occurs at times when cotton waste unmixed with hair is used.

In actual practice it has been found that 75% waste mixed with 25% curled hair forms a very good filtering composition. Hair of this proportion will not cause the filtering substance or media to channel. By channeling is meant the formation of a passage or channel through the filtering medium which will allow the contaminated oil to pass directly through the media without being filtered.

It is known that hair unmixed with other substances has been used in oil filters. Unmixed hair is disclosed in the following Patents: 1,019,645 Holdsworth, 1,020,774 Nilson, 1,462,175 Hans, 1,818,392 Hans, and 1,821,707 Hasley.

I claim:

1. A filtering substance comprising intermixed cotton waste and curled hair.

2. A filtering substance comprising a mixture of substantially 75% cotton and substantially 25% curled hair.

CHARLES W. McKINLEY.